United States Patent

[11] 3,599,715

[72] Inventor Wayne O. Roszelle
 Littleton, Colo.
[21] Appl. No. 12,457
[22] Filed Feb. 18, 1970
[45] Patented Aug. 17, 1971
[73] Assignee Marathon Oil Company
 Findlay, Ohio

[54] USE OF SURFACTANT FOAM FOR RECOVERY OF PETROLEUM
 16 Claims, No Drawings

[52] U.S. Cl. ......................................................... 116/273
[51] Int. Cl. ....................................................... E21b 43/22
[50] Field of Search............................................ 166/273, 274, 275, 305, 309

[56] References Cited
UNITED STATES PATENTS

| | | | |
|---|---|---|---|
| 2,866,507 | 12/1958 | Bond et al. | 166/274 |
| 3,177,939 | 4/1965 | Holm et al. | 166/273 |
| 3,196,944 | 7/1965 | Bernard et al. | 166/273 |
| 3,254,714 | 6/1966 | Gogarty et al. | 166/274 |
| 3,318,379 | 5/1967 | Bond et al. | 166/273 |
| 3,323,588 | 6/1967 | Rai et al. | 166/273 |
| 3,330,344 | 7/1967 | Reisberg | 166/273 X |
| 3,373,809 | 3/1968 | Cooke, Jr. | 166/274 X |
| 3,406,754 | 10/1968 | Gogarty | 166/273 |
| 3,506,070 | 4/1970 | Jones | 166/274 X |
| 3,506,071 | 4/1970 | Jones | 166/273 X |

*Primary Examiner*—Stephen J. Novosad
*Attorneys*—Joseph C. Herring, Richard C. Willson, Jr. and Jack L. Hummel

ABSTRACT: Water-external micellar dispersions containing hydrocarbon, surfactant, and 50—95 percent by volume water are contacted with a gas (e.g. air or nitrogen) to form a stable foam which is then injected into and displaced through an oil-bearing reservoir to recover crude oil. The foam may be generated in situ as well as on the surface.

USE OF SURFACTANT FOAM FOR RECOVERY OF PETROLEUM

BACKGROUND OF THE INVENTION

This invention relates to secondary or tertiary recovery of hydrocarbons from a subterranean formation containing the same. In particular, this invention relates to the generation and displacement of a bank of foam through a reservoir to recover crude oil from the reservoir.

DESCRIPTION OF THE PRIOR ART

Foam flooding has been recognized as an effective method in secondary and tertiary recovery of oil from underground reservoirs. However, in many of the conventional foam flooding techniques, recovery of residual oil has been deficient. A primary reason for this deficiency is that in conventional processes the foam loses its physical character and continuity upon displacement through the reservoir. The resulting foam either increases in mobility and breakthrough occurs (i.e. fingering), or mobility disadvantageously decreases to the point where plugging or high pressures are required to displace the foam through the reservoir.

Another drawback prevalent in conventional foam flooding is that the foam generally has a mobility within the reservoir greater than the crude oil to be displaced. This unfavorable mobility ratio gives rise to the well known adverse phenomenon of fingering and bypass of residual oil.

U.S. Pat. No. 2,866,507 to Bond et al. teaches crude oil recovery by injecting and displacing through a reservoir a foam formed by injecting gas into an aqueous solution of a water-soluble foaming agent.

U.S. Pat. No. 3,196,944 to Bernard et al. teaches an oil recovery process using a foam obtained from injecting into the reservoir a mixture of $C_8$ or lower hydrocarbon along with an oil-soluble foaming agent.

U.S. Pat. No. 3,318,379 to Bond et al. teaches in situ formation of a foam by first injecting a hydrocarbon mixture containing a surfactant (having foaming agent characteristics), and thereafter injecting a surfactant-free nongaseous liquid miscible with the first injected slug and then injecting a gas which causes the first slug to foam.

U.S. Pat. No. 3,177,939 to Holm et al. teaches a foam process by the sequential injection of: 1) aqueous solution containing a surfactant, 2) a foam-producing gas, 3) a $C_3$-$C_{10}$ hydrocarbon, and 4) an alcohol.

The disadvantages of the prior art, principally lack of control over mobility of the foam and instability of the foam are overcome by the process of the present invention. Furthermore, the process of the present invention allows the effective recovery of oil from reservoirs which have adjacent zones of varying porosity and permeability to displacing fluids.

SUMMARY OF THE INVENTION

Briefly described, the invention comprises a process for the recovery of hydrocarbons from an underground formation by injecting a foam of a water-external micellar dispersion and displacing the foam with a drive fluid; hydrocarbon is recovered through a production means. Alternatively, a mobility buffer solution may be injected behind the foam and in front of the drive fluid to give added protection against fingering. The mobility buffer can provide a graded mobility from the leading edge of the foam bank through the trailing edge of the drive fluid for better sweep efficiency and minimization of breakthrough. The water-external micellar dispersion is comprised of hydrocarbon, surfactant, and about 50—95 percent by volume water. The micellar dispersion is contacted with a foam-producing gas either at the surface or within the reservoir to produce the foam.

DETAILED DESCRIPTION OF THE INVENTION

The micellar dispersion of the present invention is water-external, i.e., water forms the continuous phase, and hydrocarbon forms the internal phase.

The micellar dispersion is comprised of hydrocarbon, aqueous medium, and at least one surfactant. One or more cosurfactants (also identifier as cosolvents, cosolubilizers, and semipolar organic compounds) are useful in the dispersions. Also, electrolytes are useful in the dispersions. The micellar dispersion is, for purposes of this invention, relatively stable dispersion and can show some Tyndall effect, but generally does not. Also, the micellar dispersion can contain other additives, e.g. corrosion and scale inhibitors, bactericides, etc. Examples of useful dispersions include those containing, by volume, from about 4 to about 45 percent hydrocarbon; from about 50 to about 95 percent, more preferably from about 70 to about 90 percent water, and most preferably from about 80 to about 90 percent water, at least about 4 percent surfactant, from about 0.01 to about 20 percent or more by volume of cosurfactant and from about 0.001 or less up to about 5 percent or more by weight of electrolyte.

Examples of useful hydrocarbons include crude oil, partially refined fractions thereof, e.g. side cuts from crude columns, crude column overheads, gas oils, kerosene, heavy naphthas, naphthas, straight run gasoline, and liquefied petroleum gases, refined fractions of crude oil and nalogenated hydrocarbons. Pure hydrocarbons are also useful, e.g. paraffinic compounds including liquefied petroleum gases, propane, pentane, neptane, decane, dodecane, etc.; cycloparaffin compounds including cyclohexane, etc.; aryl compounds including monocyclic and polycyclic and substituted products thereof including toluene, alkyl phenols, etc. and combinations of the hydrocarbons taught herein. Based on economics, the preferred hydrocarbon is one locally available and is crude oil. The unsulfonated hydrocarbon (e.g. heavy vacuum gas oils) in petroleum sulfonates is also useful.

The aqueous medium can be soft, brackish, or brine water. Preferably, the water is soft but it can contain small amounts of salts.

Useful surfactants include the various nonionic, cationic, and anionic surfactants. Examples of surfactants can be found in U.S. Pat. No. 3,254,714 to Gogarty et al. Preferably, the surfactant is a petroleum sulfonate, also known as alkaryl sulfonates or alkaryl naphthenic sulfonates. The sulfonate can contain less than 60 or up to 100 percent active sulfonate. Examples of preferred surfactants are the sodium and ammonium petroleum sulfonates having average equivalent weight within the range of about 350 to about 520, and more preferably about 390 to about 470. The surfactant can be a mixture of low and high average equivalent weight sulfonates or a mixture of different surfactants.

Examples of useful cosurfactants include alcohols, amino compounds, esters, aldehydes, ketones and ethers containing from one up to about 20 or more carbon atoms and more preferably from about three to about 16 carbon atoms. The cosurfactant is preferably an alcohol, e.g. isopropanol, n- and isobutanol, the amyl alcohols such as n alcohol, 1 and 2-nexanol, 1- and 2-octanol, decyl alcohols, alkaryl alcohols such as p-nonyl phenol, hydroxy compounds such as 2-butoxyethanol, alcoholic liquors such as fusel oil and like compounds. Particularly useful alcohols include the primary butanols, primary pentanols and secondary hexanols. Concentrations of from about 0.1 percent to more than about 10 percent by volume are preferred and more preferably from about 0.2 percent to about 3 percent. Mixtures of two or more cosurfactants are also useful.

Electrolytes useful within the micellar dispersions include inorganic bases, inorganic acids, inorganic salts, organic bases, organic acids, and organic salts. These electrolytes include those being strongly or weakly ionized. Preferably, the electrolytes are inorganic bases, inorganic acids, and inorganic salts, examples include sodium hydroxide, sodium chloride, hydrochloric acid, sulfuric acid, sodium nitrate, ammonium chloride, ammonium hydroxide, and potassium chloride. Examples of other useful electrolytes can be found in the U.S. Pat. No. 3,330,344. The type and concentration of preferred electrolyte will depend, inter alia, on the hydrocarbon phase, aqueous phase, surfactant, cosurfactant, and operating conditions, e.g. temperature.

The foam is formed by bringing the micellar dispersion into intimate contact with a compatible gas. The gas should be in the gaseous state under reservoir conditions, i.e. reservoir temperature and pressure. Suitable gases for most reservoirs include air, oxygen, nitrogen, carbon dioxide, low molecular weight hydrocarbons (e.g. methane, etc.), combustion products of natural gas, mixtures of same, and like materials.

The foam may be generated at the surface and injected through an injection well into the formation to be treated. But more preferably, the foam is generated in the injection tubing or within the reservoir. The latter may be accomplished by known means, such as by alternately pumping micellar dispersion and gas into the formation, or injection the micellar dispersion and gas simultaneously in separate tubing strings whose outlets are positioned to permit generation of the foam downhole. The foam may also be produced by first injecting the slug of micellar dispersion and then injecting the foam-producing gas.

Preferably there is injected into the reservoir about 0.5 to about 30 and more preferably about 1 to about 10 percent pore volume micellar dispersion.

Generally, when generating the foam in situ, generation will occur in the area of the well bore of the injection well. If, however, it is desired to generate the foam at a point removed from the well bore, this may be accomplished by injecting the micellar dispersion into the formation and displacing it a distance from the well bore to the point at which foam generation is desired. Thereafter, the foam-producing gas is injected into the formation and comes into contact with the displaced micellar dispersion, thus generating the foam at the desired point.

The volume of gas which is injected and comes into contact with the micellar dispersion must be sufficient to form a foam bank. Overinjection of gas may produce what is called a dry foam and allow gas breakthrough to the detriment of the recovery operation; this should be avoided. In general from about 1 to about 30 and more preferably from about 5 to about 15 volumes of gas per volume of micellar dispersion will be sufficient to generate and maintain the desired foam bank, the volume at reservoir temperature and pressure. If the foam is generated on the surface, the volume of gas is based on atmospheric temperature and pressure.

The foam bank is displaced through the reservoir to at least one producing well by preferably one of the following methods: 1) direct injection of a fluid drive material, or 2) injection of a mobility buffer (defined herein) followed by injection of a fluid drive material.

In the first case where the foam is followed directly by the fluid drive material, this fluid may be selected from a variety of fluids compatible with the foam bank. Such include water, thickened water, brine, LPG (liquefied petroleum gas), natural gas, air, oxygen, nitrogen, methane, combustion products of natural gas, and like materials. Water is preferred drive material. The compatible gas used to foam the micellar dispersion may be advantageously used in excess as the drive fluid. A sufficient amount of the drive material is injected to displace the foam bank to the outlying producing wells. The total volume amount will depend on the economics of the process, i.e. generally at least one pore volume will be injected but injection will stop when the oil recovery diminishes to an uneconomicial level. The drive materials can have mobility reducing agents, oxygen scavenging agent, bactericides, etc. incorporated therein.

In the second alternative embodiment for displacing the foam bank through the reservoir, a mobility buffer is first injected and then followed by any of the above-mentioned fluid drive materials. Thus the drive fluid displaces the preceding mobility buffer, foam bank, and formation hydrocarbons to the producing wells. By "mobility buffer" is meant a fluid, either aqueous or nonaqueous, which has an effective mobility within the reservoir favorable to uniform displacement of the bank of foam of micellar dispersion. By favorable mobility ratio is meant that the ratio of the mobility of the mobility buffer to that of the foam bank is about equal to or greater than unity.

Mobility buffer fluids may be gaseous but are preferably liquid (aqueous or nonaqueous). Examples include water, brine, hydrocarbon (e.g. lower molecular weight) and like materials containing sufficient mobility reducing agent to reduce the mobility of the fluid within the reservoir. An mobility reducing agent is useful as long as it permits a reduction in the effective mobility of the mobility buffer flowing in the reservoir and is compatible in the reservoir. Examples of useful mobility-reducing agents include partially hydrolyzed, high molecular weight polyacrylamides, polysaccharides, polyethylene oxides, carboxy methyl cellulose, carboxy vinyl polymer, polyethyleneglycol, polyisobutylene, polymers containing sulfonic grouping (can be neutralized), diacetone acrylamide groupings, vinyl grouping and like groupings. The Dow Pusher polymers, e.g. Dow Pusher 530, etc. are particularly effective with the invention.

Although not necessary, it is preferable to grade the mobility of the front portion of the mobility buffer from a mobility about equal to the back portion of the foam bank to a mobility nearly equal to the subsequent drive fluid at the buffer's trailing edge.

Generally there is injected into the formation preferably from about 5 to about 80 percent, more preferably about 20 to 70 percent and most preferably from about 40 to about 60 percent pore volume of the slug of mobility buffer. The most preferred method is to follow the foam bank with a mobility buffer comprised of water and partially hydrolyzed, high molecular weight polyacrylamides or other like polymers, and utilizing water as the drive fluid. If nonaqueous mobility buffer solutions are used, e.g. polyisobutylene, it is preferred to use a drive material compatible with the nonaqueous mobility buffer, e.g. natural gas, LPG, or straight run gasoline.

The following examples are submitted to teach specific embodiments of the invention. These examples are not meant to limit the invention in any manner, but are merely illustrative of the invention. The components of the micellar dispersion are mixed by agitation in any suitable manner, such as by stirring, shaking, rotary stirring, or pumping to form the stable micellar dispersion. By stable is meant that the dispersions are thermodynamically stable, appearing to be singled phase and substantially transparent. The resulting dispersion is then contacted with the foam-producing gas at the surface or admixed in situ as discussed above. Percents are based on volume unless otherwise specified.

EXAMPLE I

A core sample, having a permeability to hexane of -amyl 187 md., a pore volume of 8.65 cm.$^3$, is saturated with crude oil (viscosity about 7 cp. at ambient temperature) and waterflooded with water containing about 20,000 p.p.m. of total dissolved solids. The initial oil saturation of the core sample is 75 percent and the oil saturation after waterflooding is 39 percent. A micellar dispersion is made up consisting of 88 ml. of distilled water, and 12.7 g. of a sulfonate mixture (30 volume percent vacuum gas oil, 6 volume percent $n$alcohol, and the remainder an ammonium alkyl aryl naphthenic sulfonate having an average equivalent weight of 440). This dispersion is placed in a tank and is contacted with air to produce a foam. This is effected by passing the air through a tubing projecting upwardly from the bottom of the tank and then through sintered glass placed at the outlet of the tubing to produce air bubbles which foam the dispersion upon contact. The foam is injected into the core sample and followed by air injection. Air injection is continued until no further liquid is produced. During foam and air injection, a total of 6.9 cc. of fluids is produced of which 1.9 cc. is oil. This represents 56 percent of the oil-in-place. Thereafter, water is injected and after injection of approximately 12 cc. of water, the total fluid production is 8 cc. of which 1 cc. is oil. The total oil recovery is 86 percent of the oil in place.

EXAMPLE II

A Berea core, 112 cm. in length, having a diameter of 7 1/2 cm., a pore volume of 1,037 cc. a porosity of about 20 percent and an average permeability of about 1,226 millidarcies is saturated with crude oil (viscosity 7.8 cp. at ambient temperature) and then waterflooded with water containing about 20,000 p.p.m. of the total dissolved solids. Initial oil saturation of the core is about 63 percent pore volume (before waterflood) and the oil saturation after waterflooding is about 36 percent. A micellar dispersion is obtained by mixing 88.9 percent water, 2.5 percent unsulfonated heavy vacuum gas oil, 0.14 percent ammonium sulfate, 0.7 percent primary amyl alcohol, and 7.8 percent ammonium naphthenic sulfonate (average equivalent weight 440). Two percent (i.e. based on the core sample) of the micellar dispersion and 24 percent pore volume (based on the core) of nitrogen are simultaneously injected into the core sample (producing foam upon contact) and displaced through the core sample by at least 1 pore volume of a mobility buffer containing 1,000 p.p.m. of Dow 700 Pusher polymer dissolved in fresh water, the water containing 400 p.p.m. of total dissolved solids, and 40 p.p.m. of divalent ions. A total recover of 77 percent of the oil-in-place based on the original oil saturation is realized.

What I claim is:

1. A process for the recovery of hydrocarbons from a hydrocarbon-containing subterranean formation having at least one injection means in fluid communication with at least one producing means, the process comprising:
   a. displacing a foam through the formation toward producing means, the foam obtained by foaming a water-external micellar dispersion with a foam producing gas compatible with said micellar dispersion, and
   b. recovering hydrocarbons through said producing means.

2. The process of claim 1 wherein the foam is produced in the subterranean formation by contacting the micellar dispersion with the foam producing gas in situ.

3. The process of claim 1 wherein the foam is produced at the surface and injected into the subterranean formation through said injection means.

4. The process of claim 1 wherein the micellar dispersion is comprised of hydrocarbon, water, and surfactant.

5. The process of claim 4 wherein the water-external micellar dispersion comprises from about 4 to 45 volume percent hydrocarbon, about 50 to 95 volume percent water, and from about 4 to 20 volume percent surfactant.

6. The process of claim 5 wherein the micellar dispersion contains from about 0.01 to 20 volume percent of cosurfactant.

7. The process of claim 5 wherein the micellar dispersion contains about 0.001 to about 5 percent electrolyte.

8. The process of claim 1 wherein the foam is displaced by injecting a fluid drive material into the formation.

9. The process of claim 8 wherein the drive material is a gas.

10. The process of claim 8 wherein the drive material is an aqueous medium.

11. The process of claim 8 wherein about 5 to 80 pore volume of a mobility buffer is injected after the foam, having a mobility about equal to or greater than said foam.

12. The process of claim 11 wherein the mobility buffer has a mobility about equal to or less than about that of the back portion of the foam.

13. A process for recovery of hydrocarbon from a hydrocarbon containing subterranean formation having at least one injection means in fluid communication with at least one producing means, the process comprising:
   a. injectig into the formation a water-external micellar dispersion comprising about 4 to about 45 percent hydrocarbon, about 50 to about 95 percent water, and at least about 4 percent surfactant, the percents based on volume, and,
   b. injecting a gas compatible with the micellar dispersion into the formation simultaneously with or subsequent to injection of said micellar dispersion so that when the gas and micellar dispersion come into intimate contact a foam is generated, thereafter,
   c. injecting into the formation about 5 to 80 percent pore volume of a mobility buffer, and
   d. injecting a drive material to displace the foam and mobility buffer toward the producing means and recovering hydrocarbon through said producing means.

14. The process of claim 13 wherein the mobility buffer comprises water and a mobility reducing agent.

15. The process of claim 13 wherein the drive material is water.

16. The process of claim 13 wherein the mobility of the front portion of the mobility buffer is about equal to or less than the mobility of the back portion of the foam.

UNITED STATES PATENT OFFICE
CERTIFICATE OF CORRECTION

Patent No. 3,599,715    Dated Sept. 27, 1971

Inventor(s) Wayne O. Roszelle

It is certified that error appears in the above-identified patent and that said Letters Patent are hereby corrected as shown below:

| | |
|---|---|
| Col. 2, line 8: | Delete "identifier" and insert --identified--. |
| Col. 2, line 28: | Delete "nalogenated" and insert --halogenated--. |
| Col. 2, line 30: | Delete "neptane" and insert --heptane--. |
| Col. 2, line 60: | Delete "2-nexanol" and insert --2-hexanol--. |
| Col. 3, line 22: | Delete "injection" and insert --injecting--. |
| Col. 4, line 15: | Delete "An" and insert --Any--. |
| Col. 4, line 59: | Delete "amyl". |
| Col. 4, line 67: | Delete "nalcohol" and insert --n-amyl alcohol--. |
| Col. 5, line 30: | Delete "recover" and insert --recovery--. |
| Col. 6, line 26: | Delete "injectig" and insert --injecting--. |

Signed and sealed this 15th day of February 1972.

(SEAL)
Attest:

EDWARD M. FLETCHER, JR.
Attesting Officer

ROBERT GOTTSCHALK
Commissioner of Patents